(12) United States Patent
Wilkes et al.

(10) Patent No.: US 6,693,766 B1
(45) Date of Patent: Feb. 17, 2004

(54) DISK DRIVE SYSTEM WITH HYBRID SURFACE-BASED DATA MAPPING AND METHOD OF OPERATION THEREOF

(75) Inventors: John Wilkes, Palo Alto, CA (US); Gregory Robert Ganger, Pittsburgh, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 485 days.

(21) Appl. No.: 09/668,121

(22) Filed: Sep. 21, 2000

(51) Int. Cl.[7] .............................................. G11B 5/596
(52) U.S. Cl. ........................................ 360/78.08; 711/4
(58) Field of Search ........................... 360/78.08, 78.01, 360/78.04; 711/4

(56) References Cited

U.S. PATENT DOCUMENTS

| | | | | |
|---|---|---|---|---|
| 5,854,778 A | * | 12/1998 | Shimizu et al. | 369/59.26 |
| 5,940,242 A | * | 8/1999 | Lee | 360/78.08 |
| 6,105,104 A | * | 8/2000 | Guttmann et al. | 711/4 |
| 6,466,387 B1 | * | 10/2002 | Ogasawara et al. | 360/48 |
| 6,512,652 B1 | * | 1/2003 | Nelson et al. | 360/78.01 |

OTHER PUBLICATIONS

Ruemmler, Chris and Wilkes, John, "An introduction to disk drive modelling", IEEE Computer 27(3): Mar. 17–29, 1994.

* cited by examiner

Primary Examiner—David Hudspeth
Assistant Examiner—Jason Olson

(57) ABSTRACT

An apparatus is provided for surface-based data mapping for a disk drive system and a method of operation in which adjacent data tracks on the data storage surfaces of a disk drive are grouped into data track sets and data track sets on different data storage surfaces are grouped into bunches. The bunches are used to determine how to perform the logical to physical data layout mapping inside the disk drive. A disk drive controller controls disk read/write heads and provides a data layout mapping that maps logically adjacent data blocks to a data track, then to an adjacent data track radially along the same surface in a data track set in a bunch, and then to a different data track in a different data track set in the bunch.

27 Claims, 5 Drawing Sheets

DISK DRIVE SYSTEM WITH HYBRID SURFACE-BASED DATA MAPPING AND METHOD OF OPERATION THEREOF

TECHNICAL FIELD

The present invention relates generally to reading and writing data on disk drive systems and more particularly to modifying surface-based data mapping to improve the performance of a disk drive system.

BACKGROUND ART

Disk drives contain both electronic and mechanical components. It has long been the case that electronic devices have experienced rapid improvements in performance—for the last several years, they have been able to roughly double in speed every eighteen months. However, the performance of the mechanical components have not increased nearly as quickly, because their behavior is limited by the laws of physics, which provide bounds on how fast the mechanical components can be moved for a given applied power and mechanical strength. As a result, the behavior of the mechanical components has tended to dominate the overall performance of disk drives.

A modern disk drive unit contains one or more platters, on the top and bottom surfaces of which data blocks are recorded. These data blocks are grouped into circular 360° groups of blocks around the spindle, known as data tracks. The data tracks are packed very closely together—often there will be several thousand data tracks per inch of radius. A set of data tracks (one data track per surface) with the same nominal radius from the spindle is known as a cylinder. Data is read or written to a data block by means of a read/write head; there is one such head per platter surface, and the head is moved into position by means of an arm that can rotate about a pivot point. Moving the arm moves the head (this is known as a head seek, or just a seek). There is usually one arm per platter surface, and all the arms are mechanically joined together, so that all the heads also move in unison. Even though the head can be moved very quickly—traversing from the innermost data track to the outermost one in a few milliseconds—this is still very long compared to the speed of the electronics.

Positioning the read/write heads at the end of a head seek requires exquisite care. The data tracks are so close together that mis-positioning the read/write head by even a tiny fraction of an inch could mean that the wrong data could be read, or (much worse) data could be written in the wrong place. Achieving this fine positioning takes time (referred to as the settling time), during which the head is jiggled back and forth or settled to precisely the right position for the target data track. As data tracks get squeezed ever closer together, the settling time becomes an increasingly important fraction of the entire seek time. This is especially true for small movements—indeed, it is already the case that the settling time forms the majority of time spent in a small seek—one that moves the head across only a few data tracks.

Because the mechanical positioning times are so important to the performance of disk drives, a great deal of effort has been expended to find ways to minimize the amount of time that a disk drive spends doing such movements. Two basic techniques are used: data layout mappings that minimize the amount of head seeking, and scheduling algorithms that try to minimize the amount of seeking required to perform a set of several read/write requests. Data layouts and scheduling algorithms are generated in two places: (1) in the software that runs on the host computer that uses the disk drive, and (2) in the controller logic of the disk drive itself.

The first type of mapping comes from host-based file systems and database systems, which go to great lengths to lay data out in a manner that takes advantage of the mechanical properties of disk drives. For example, they try to place logically adjacent portions of a single file or database table in physically adjacent locations on the disk drive, so that mechanical motion is minimized. One commonly used scheme is to treat all the data tracks in a cylinder as being "close together", and to try to put all or most of the data blocks of a single file in the same cylinder. The idea here is that once the first read/write head is in position for a data block of the file, then all the other read/write heads will also be lined up, ready to read or write other data blocks of the file without incurring any additional seek time.

The second type of mapping that occurs takes place inside the disk drive itself. This mapping hides low-level details of the disk drive's data placement from the host file system and database. It allows the disk drive to do sparing (putting aside small regions on a platter to handle the occasional bad spot), and zoning (putting more data blocks on the longer data tracks found near the outside edge of the platters) without having to communicate all the details of how this is done to the host computer system. This mapping is manifested by making the disk drive appear to have a single list of data blocks, numbered consecutively from zero to some large value (these numbers are known as the block addresses). By convention, consecutive logical block addresses are mapped as much as possible to physically adjacent data blocks in the same data track, and then onto vertically adjacent data tracks in the same cylinder, an arrangement known as cylinder-based mapping. This allows the host file systems and databases to assume that data blocks with logical addresses that appear "close together" will be placed "close together" on the disk drive too from the point of seek distances.

Request scheduling algorithms choose the order in which to perform a set of two or more host requests. These often select an order that minimizes the distance between successive requests (e.g., by sorting them in cylinder order), thereby reducing the average seek distance, and, in turn, increasing the relative proportion of small seeks in the workload sent to the disk drive.

Unfortunately, the simple cylinder model is breaking down in modem disk drives; the data tracks are too close together for them to remain perfectly aligned across the different platters. For example, the power dissipated by the disk motor and electronics may heat up the platters by different amounts, causing them to expand differentially. The effect is that switching from one data track to another data track in the same cylinder (i.e., on a different surface) may require a head repositioning (typically a settling time, but maybe even a short seek across a few data tracks).

Moving one read/write head from one data track to access another data track on the same surface is called a "track switch", and switching access from one read/write head to another read/write head for a different surface in the same cylinder is called a "head switch". In today's disk drive systems, the head switch is slightly quicker than the track switch, but as the data tracks get closer and closer together, this will no longer be the case. In particular, it appears that a track switch may become two or three times faster than a head switch. Thus, continuing to use data layouts that favor head switches over track switches is no longer time efficient. A better approach would be to use track switches instead of head switches wherever possible—with the result that the disk drive would map its block address space to fill all of one surface before moving on to the next one. Such a scheme might be called a "surface-based" data mapping.

However, applying such a simple surface-based data mapping in the disk drive would be counter-productive; it would conflict with the larger-scale layout optimizations made by today's file systems and databases, which try to exploit the notion of cylinders inside the disk drive.

DISCLOSURE OF THE INVENTION

The present invention provides an apparatus for surface-based data mapping for a disk drive system and a method of surface-based data mapping. Adjacent data tracks on the data storage surfaces of a disk drive are grouped into data track sets and data track sets on different data storage surfaces are grouped into bunches. The bunches are used to determine how to perform the logical to physical data layout mapping inside the disk drive. A disk drive controller controls disk read/write heads and provides a data layout mapping that maps logically adjacent data blocks to a data track, then to an adjacent data track radially along the same surface in a data track set in a bunch, and then to a different data track in a different data track set in the bunch. This improves the performance of data transfers occurring in the disk drive system and provides a cost optimal order for accessing data on a surface of a data storage platter that takes advantage of characteristics associated with technical advancements in the disk drive system field. It also maintains performance compatibility with current upper-level file system, database, and operating system software.

The present invention further provides an apparatus for surface-based data mapping for a disk drive system and a method of surface-based data mapping in which mapping is performed between adjacent bunches.

The present invention further provides an extension in which the adjacent data tracks on a surface that are grouped into a track set are configured as a spiral, rather than as a set of concentric circles. This further improves the performance of sequential transfers.

The above and additional advantages of the present invention will become apparent to those skilled in the art from a reading of the following detailed description when taken in conjunction with the accompanying drawings.

BEST MODES FOR CARRYING OUT THE INVENTION

Figure 1:
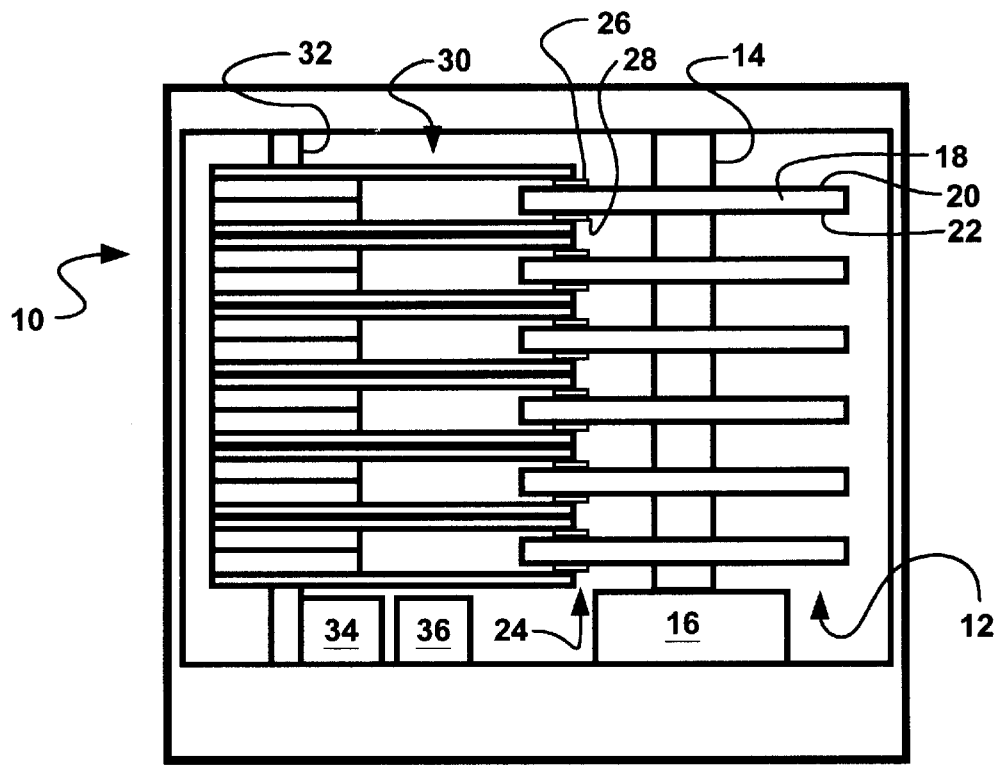
FIG. 1 is a disk drive system according to the present invention.

Referring now to FIG. 1, therein is shown a disk drive system 10 according to the present invention containing a number of horizontal disk-like platters 12. Modern disks drives include platters that range in size from 1 to 8 inches in diameter with 2.5, 3.5, and 5.25 inches being the most common diameters. The stack of platters 12 spins at high speed, around 10,000 rpm, as a single unit on a vertical central spindle 14 driven by a spindle motor 16.

The term "horizontal" as used in herein is defined as a plane parallel to the conventional plane or surface of a platter, such as one of the platters 12, regardless of the orientation of the platter. The term "vertical" refers to a direction perpendicular to the horizontal as just defined. Terms, such as "on", "above", "below", "side", "topside", "underside", "over", and "under", are defined with respect to the horizontal plane.

Each of the platters 12, such as the platter 18, has two surfaces, a topside and an underside data storage surface 20 and 22, respectively. The data storage surfaces are capable of retaining magnetic flux variations that are sensed to retrieve, or read, data and that are modified to store, or write, data.

Each of the data storage surfaces has one of the read/write heads 24; e.g., the data storage surfaces 20 and 22 have associated magnetic read/write heads 26 and 28, respectively. The read/write heads 24 are all vertically stacked one over the other to read/write to vertically stacked data tracks. The read/write heads 24 are suspended over the platters 12 by an actuator arm unit 30 on a pivot 32, which is driven by a pivot arm drive 34 controlled by a disk drive controller 36. When the platters 12 are rotated at high speed, a cushion of air forms and the read/write heads 24 are lifted out of direct contact with the platters 12.

Figure 2:
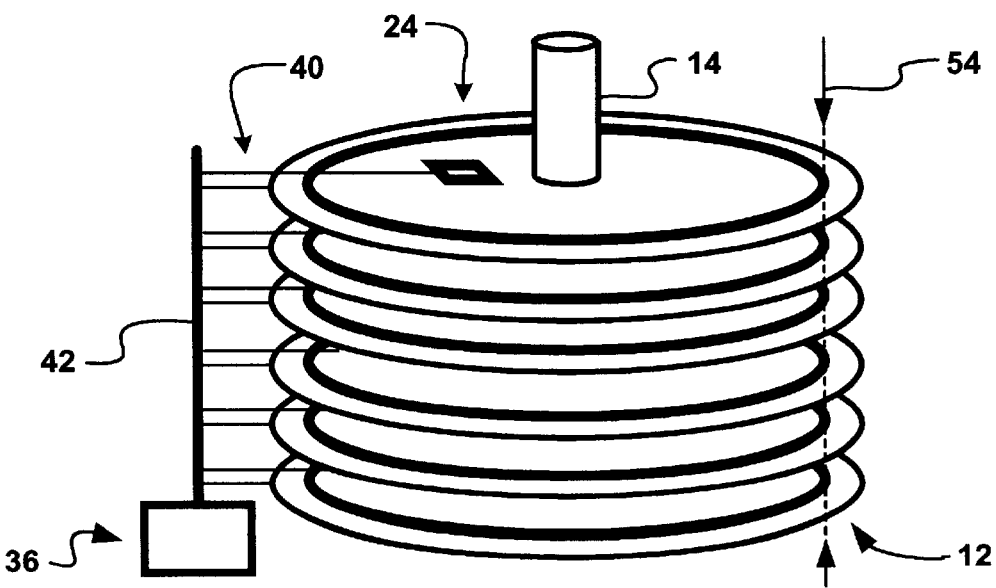
FIG. 2 illustrates the electrical components of a disk drive system according to the present invention.

Referring now to FIG. 2, therein is shown an isometric illustration of the read/write components of the disk drive system 10 according to the present invention. The read/write heads 24 are connected to read/write leads 40, which connect the read/write heads 24 to a read/write data channel 42. The read/write data channel 42 is connected in turn to the disk drive controller 36.

The disk drive controller 36 manages the read/write heads 24, the spindle motor 16, and performs a data layout mapping between the logical addresses presented to a client computer system and the addresses of the sectors on the physical platters 12. The disk drive controller 36 controls the pivot arm drive 34 which provides precise movements of the actuator arm unit 30 to position the read/write heads 24 over particular locations on the platters 12. The disk drive controller 36 typically contains a microprocessor, some buffer memory, a digital signal processor, and an interface to a computer interconnect such as a SCSI (Small Computer Systems Interconnect) bus.

Figure 3:
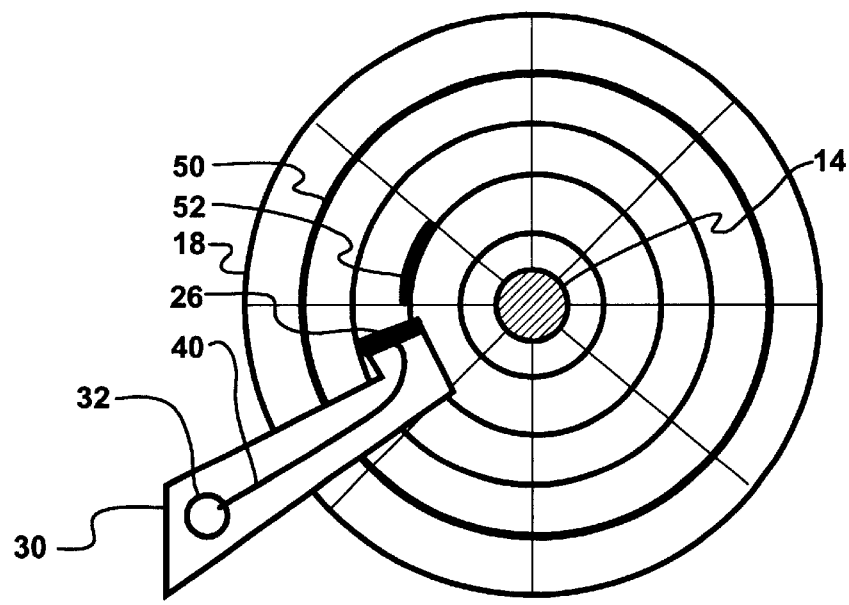
FIG. 3 illustrates a top view of the disk drive system according to the present invention.

Referring now to FIG. 3, therein is shown a top view of a typical platter, such as the platter 18, according to the present invention. Each surface 20 or 22 of the platter 18 is set up to store data in a series of concentric locations (sectors), which form a set of concentric circles around the spindle 14 as exemplified by a data track 50. The data track 50 includes a plurality of sectors, such as a sector 52, where a block of data may be recorded. A single vertical stack of data tracks equidistant from the spindle 14 is called a "cylinder", such as cylinder 54 shown in FIG. 2. A typical 3.5" diameter platter 18 has about 2000 cylinders. To access the data stored on the data track 50 for example, the read/write head 26 is moved over the data track 50 and the platter 18 rotates to allow the read/write head 26 to sense the magnetic flux changes used to store the data in the track.

Since the read/write heads 24 (shown in FIG. 2) move as a unit, moving one read/write head causes all the other read/write heads 24 to be positioned over an equivalent data location in the cylinder 54.

The disk drive system 10 appears to its client computer (not shown) as a memory device with a linear vector of addressable blocks, each data block typically is 256–1024 bytes in size. These data blocks must be mapped to physical sectors, such as the sector 52 on the platter 18. The disk drive controller 36 mediates access to the platters 12 and provides transfers of data between the disk drive system 10 and its client computer.

As previously mentioned, positioning time is made up of two components: the seek time and the rotation time. The seek time involves moving the read/write head 26 onto the right data track 50 or cylinder 54. The rotation time involves the time it takes for the data stored on the sector 52 to come underneath the read/write head 26 once it is in the proper data track or cylinder position. Accordingly, minimizing the seek time of the read/write head within a disk drive system maximizes the speed of operation.

Also as previously mentioned, modern operating systems include file systems and device drivers which optimize the layout of data on the disk drive systems by minimizing the distance that the actuator arm unit 30 for the read/write heads 24 has to travel. The file systems keep track of where previous data for files and programs have been placed and, in order to minimize the seek time, the file systems tend to favor short seeks over long seeks. The net effect is that closely related data is commonly placed in the same cylinder rather than in the same surface of a platter.

Figure 4:
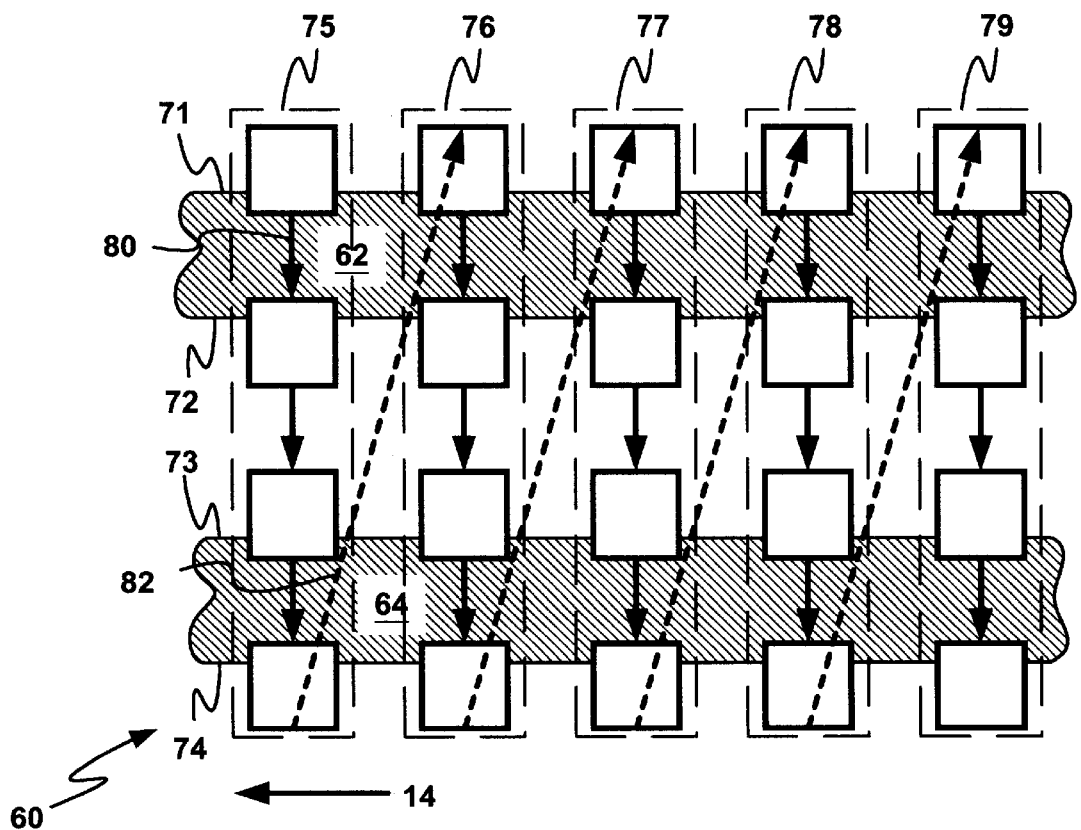
FIG. 4 (PRIOR ART) illustrates a cylinder-based data mapping of a stacked platter assembly.

Referring now to FIG. 4 (PRIOR ART), therein is shown a representative array 60 of data locations for traditional mapping of data on to the disk drive system 10 on half a platter with the spindle 14 (not shown but in the direction indicated by the arrow) taken to be on the left. The array 60 represents a diagrammatic cross-section with two horizontally extending, vertically stacked platters 62 and 64. The first platter 62 includes topside surface 71 and underside surface 72, and the second platter 64 includes topside surface 73 and underside surface 74.

Each surface contains a plurality of data tracks, which taken in cross section are represented by square blocks on the surfaces 71–74. A plurality of data tracks equidistant from the spindle 14 on different surfaces forms a cylinder. A representative array 60 has a plurality of concentric cylinders, such the cylinders 75–79. The surface and cylinder can form a coordinate system with a data track 71/75 being on the surface 71 in the cylinder 75, and a data track 74/79 being on surface 74 in the cylinder 79.

The data layout mappings described here will be presented as if a sequence of requests to write into logically adjacent data blocks were being issued, and the mapping was being used to "fill" the disk sectors in an appropriate order. This description is solely for illustrative purposes; the actual mapping will be the same whether or not the accessing is contiguous in this fashion, and whether reads or writes are being issued.

In the past, beginning with the data track 71/75, the traditional data layout mapping favored head switching. As soon as this track 71/75 was filled, the next one selected 72/75 would be on a different surface of the same cylinder, requiring a typical head switch 80 to access it. Subsequent head switches 80 were performed down the cylinder 75 until all the data tracks 73/75 through 74/75 had been filled. Then a head and track switch 82 was performed to the data track 71/76. Then the addressing process repeated with the filling of data tracks in cylinders 76–79.

As the need for greater storage capacities continues to increase, forcing greater improvements in data track densities of magnetic platters for next generation disk drive systems, the data track density improvements change long-standing assumptions for minimizing the positioning time for a disk drive system. The data track density improvements cause the individual data tracks of the platters 12 to become ever closer and closer together. As the individual data tracks become closer and closer together, the likelihood of the read/write heads 24 within a cylinder being correctly aligned becomes less and less, and a short seek on a head switch becomes necessary more often than not. Since a track switch only involves a very short settling time, the time needed to perform one is becoming two or three times shorter than for a head switch.

Figure 5:
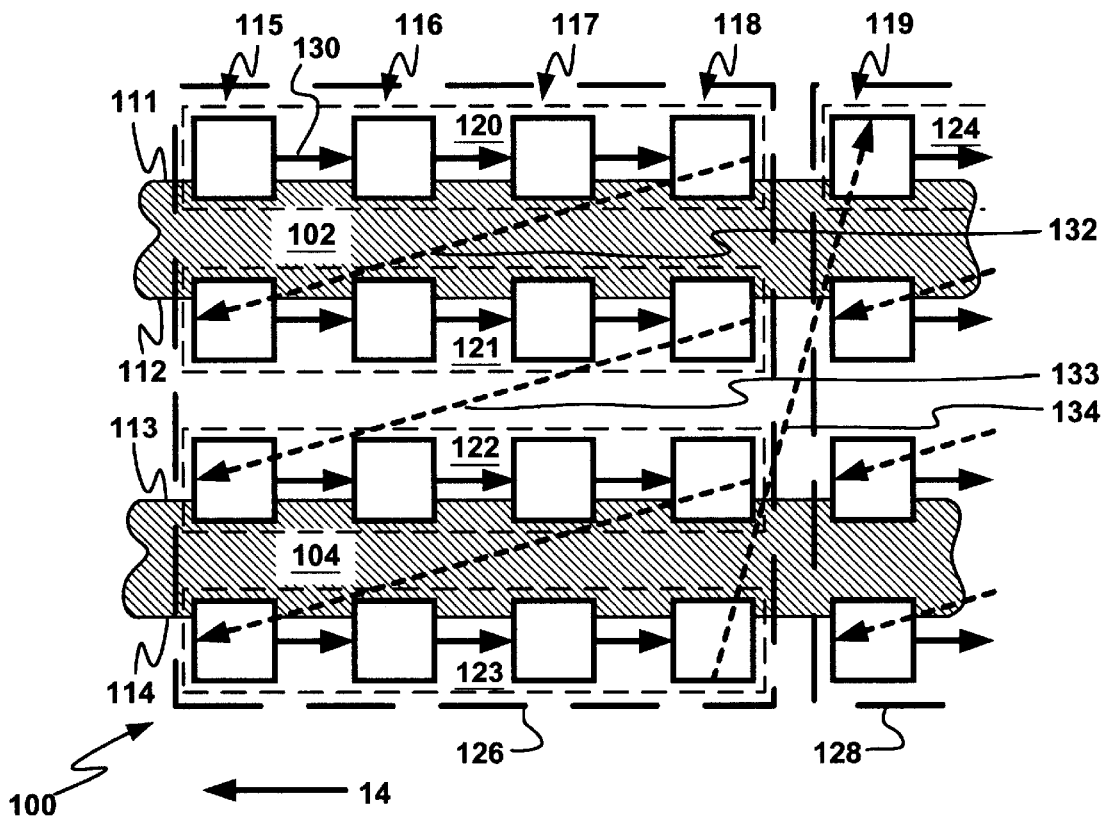
FIG. 5 illustrates a unidirectional surface-based data mapping of a stacked platter assembly according to the present invention.

Referring now to FIG. 5, therein is shown an array 100 for a unidirectional surface-based data mapping of the disk drive system 10 according to the present invention. The array 100 uses the same nomenclature and numbers as in FIGS. 1 through 4 where appropriate. The unidirectional surface-based data mapping provides a compromise between the traditional single cylinder layout and a purely horizontal surface-based mapping. A purely horizontal surface-based mapping would access all data tracks within a surface before performing a head switch to another surface. In the hybrid unidirectional surface-based data mapping of the present invention, logically-adjacent tracks are first laid out horizontally for a small interval and then a head switch is performed before logically-adjacent tracks are laid out horizontally again.

The partial surface-based data layout provides better performance than the pure cylinder-based mapping because it reduces the number of relatively expensive head switches. At the same time, it retains performance compatibility with current host software by not adopting a purely surface-based data layout, and thereby does not unduly disrupt the effects of their data layout algorithms.

Accordingly, FIG. 5 illustrates the unidirectional surface-based data layout mapping of the array 100. The array 100 represents a section of the disk drive system 10 including two platters 102 and 104. The first platter 102 includes topside and underside surfaces 111 and 112, respectively, and the second platter 104 includes upper and underside surfaces 113 and 114, respectively.

The unidirectional data layout mapping starts by filling the data track 111/115 and then performing a plurality of track switches in which data tracks 111/116 through 111/118 are filled. The set of data tracks on a single surface involved in this plurality of track switches are referred to as a data track set. Surfaces 111 through 114 have respective data track sets 120 through 123. The number of data tracks in a data track set is referred to as the surface-mode width; the optimal value of the surface-mode width is heuristically determined and is a function of the particular performance characteristics of the disk drive system 10 and the workload. In FIG. 5, four data tracks 111/115 through 111/118 are shown merely as an example as is the vertically adjacent positioning of the data track sets 120 through 123 which could be on non-adjacent surfaces.

In FIG. 5, the stack of data track sets 120 through 123 make up a bunch 126. Another bunch 128 (only partially shown) starts with a data track 111/119 in a data track set 124.

The data layout mapping for the bunch 126 starts by filling the data track 111/115, and continues with filling the data tracks 111/116 through 111/118 in the data track set 120; a plurality of head switches starting with head switch 130 is used to connect these data tracks. After filling the data track 111/118, a head and track switch 132 is performed to data track 112/115 in the data track set 121. Data layout mapping continues horizontally along the surface 112 from data track 112/115 to fill the data track set 121, and then another head and track switch 133 is performed to the data track 113/115 in the surface 113. This data track set filling followed by a head and track switch continues until the bunch 126 has been completely covered and the data track 114/118 has been filled. In the above example there are four track switches per surface and three head and track switches between surfaces.

At the end of the bunch 126, a number of different bunch-to-bunch switches can be performed. One example is a head and track switch called a "to-top-bunch-switch". A to-top-bunch-switch 134 that relocates the access from the filled data track 114/118 in the data track set 123 in the bunch 126 to the data track 111/119 in the data track set 124 in the bunch 128.

In summary, the unidirectional surface-based data mapping begins from the innermost data track of a surface and is performed out towards the outermost data track of the top data track set for a given bunch. When the outermost data track set is filled, the mapping then proceeds to the innermost data track of another surface and moves out towards the outermost data track of the data track set for the same bunch. When all of the data track sets for the given bunch have been mapped, the unidirectional surface-based data mapping restarts with the innermost data track of the top data track set of another bunch.

By moving to the innermost data track of the bunch after a head switch, additional seek time is incurred by the read/write head in accessing the first data track of the bunch. Similarly, performing the to-top-bunch-switch also requires a head-and-track-switch that incurs additional seek time to begin a new bunch after the last surface of the last platter is accessed.

It will be understood that the use of the inner to outer data layout mapping described here could equally well be replaced with a mirror mapping, in which the address map started at the outside edge of the platters and worked its way inwards. Also, the top to bottom surface mapping could be in some other sequence including skipping surfaces and filling them later.

This unidirectional surface-based data mapping approach maintains file management compatibility with current upper-level software and their disk operating systems.

Figure 6:
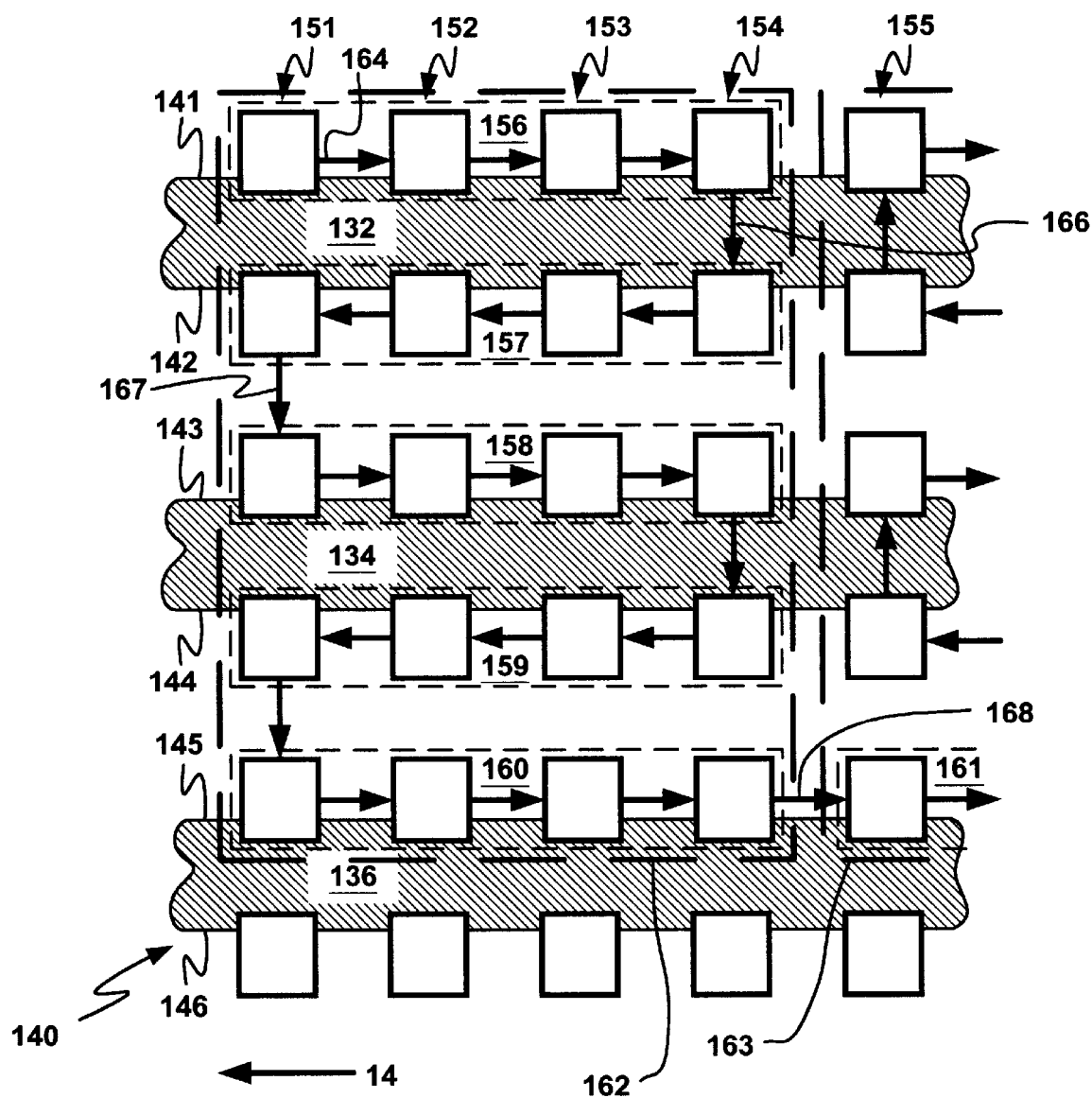
FIG. 6 illustrates a bi-directional surface-based data mapping of a stacked platter assembly according to the present invention.

Referring now to FIG. 6, therein is shown an alternative mode in which an array 140 depicts a bi-directional surface-based data mapping of the present invention. The array 140 uses the same nomenclature and numbers as in FIGS. 1 through 4 where appropriate. The disk drive system 10 has three platters. A first platter 132 has upper and lower surfaces 141 and 142, a second platter 134 has upper and lower surfaces 143 and 144, and a third platter 136 has upper and lower surfaces 145 and 146. The data tracks on the surfaces form data track sets 156 through 160 and the stacked data track sets form a bunch 162. A portion of another bunch 163 is also shown having a data track 145/155 in a data track set 161.

The bi-directional data layout mapping starts by filling the data track 141/151 and then performing a plurality of track switches as the data track set 156 is filled. After this, a typical head switch 166 is performed to the data track 142/154 in data track set 157 in the bunch 162. Data layout mapping continues with track switches moving sequentially inward from the data track 142/154 through 142/151 to fill the data track set 157. Next, a head switch 167 is performed that switches the mapping to the data track 143/151 in the data track set 158 in the bunch 162. The data layout mapping continues outward along the surface 143 until the data track set 158 is filled, after which another head switch occurs to surface 144 and the data track 144/154 in the data track set 159. This bi-directional surface-based data mapping continues to the end of the bunch 162 at the data track 145/154 in the data track set 160. Thus, the mapping is first in one direction along a surface and then in a second direction along the next surface.

As before, at the end of the bunch 162, a number of different bunch-to-bunch switches can be performed. Another example is a track switch called a "same-surface-bunch-switch". A same-surface-bunch-switch 168 is performed just like a track switch 164. The same-surface-bunch-switch 168 is a mapping that connects the filled data track 145/154 in the bunch 162 to the data track 145/155 in the data track set 161 in the bunch 163 on the same surface 145.

While not shown, track switches are then performed outward on the surface 145 until all the data tracks of the track set 161 in bunch 163 are filled. Then, a head switch is performed to the next surface 144 in the bunch, and horizontal track switches are performed inward in its data track set.

The bi-directional surface-based mapping of a disk drive system reduces read/write head positioning time whenever a head switch occurs compared with the unidirectional surface-based mapping because the next data track resides either immediately below or above the present data track; and half of the time, this next data track is on the other surface of the same platter, thereby minimizing the effects of thermal-expansion variations. Furthermore, the same-surface-bunch switch 168 reduces read/write head positioning time because the same read/write head is used to address data at the start of the new bunch. The same-surface-bunch switch can also be inward among the bunches as well as outward as shown.

Further, it will be understood that not all surfaces in a stack need to be part of the same bunch. For example, the data tracks 146/151 through 146/154 can be part of a different bunch.

As before, the optimal surface-mode width depends upon the operating characteristics of the disk drive system 10 and the characteristics of the workload presented to the disk.

Figure 7:
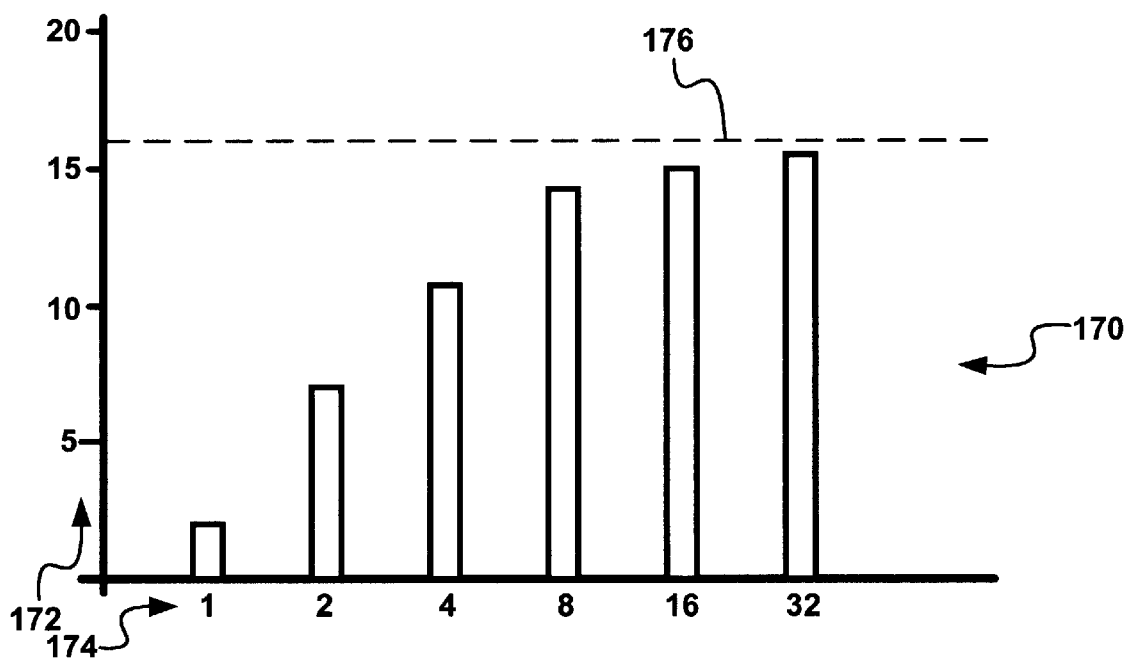
FIG. 7 illustrates bar graphs of data transfer improvements of varying surface mode widths according to the present invention.

Referring now to FIG. 7, therein is shown a bar graph 170 of average sustained media transfer rates normalized to traditional data mapping with varying numbers of data tracks in a data track set, or surface-mode widths, derived during an evaluation of the present invention. The vertical scale 172 of the bar graph represents percent improvement for sustained media bandwidth, and the horizontal scale 174 represents surface-mode width of a data track set. The dotted line 176 represents the theoretical ideal transfer rate. The disk drive system characteristics correspond to a disk drive system rotating at 7200 rpm with a magneto-resistive (MR) read/write head performing bi-directional same-surface bunch switching. By performing bi-directional same-surface bunch switching, even a surface-mode width of one achieves an improvement of two percent over conventional unidirectional cylinder switching. Sustained media bandwidth performance improves as the surface-mode width increases from one until an overall improvement of almost 15 percent compared to the cylinder-based mapping is achieved with a surface-mode width of 32.

The best-case surface-mode width for the present invention is function of at least some of the following factors:
   the disk characteristics, including but not limited to the inter-track and inter-head switch time;
   the workload; and
   the file system and the layout policies used.

It has been determined by simulation studies that surface-mode widths in the 8 to 32 data track range provide the best performance improvement for the disk drive systems studied although it will be understood that changes in the above parameters will modify this range.

In actual application in the design of a disk drive system, the surface-mode width for a disk will probably be established at the time the disk drive is formatted. However, it may well be the case that different surface-mode widths perform best on different portions (or zones) of the disk, as a result of the different data track lengths at different radii. Thus, a mapping may well use more than one surface-mode width at a time.

Similarly, as evident from an understanding of the present invention, it may also be the case that changing the surface-mode width(s) is advantageous as a result of a different workload than the one used when the disk was formatted. For example, the disk drive controller 36 could be set up to accumulate data on what the best surface-mode width or widths should be for the current workload. The disk drive system could then change to this value or values in order to improve its performance. The switch could be performed when the disk is destructively re-formatted or the switch could be a slow migration: either on request, or as a background operation, such as when the disk drive system is not otherwise occupied.

Figure 8:
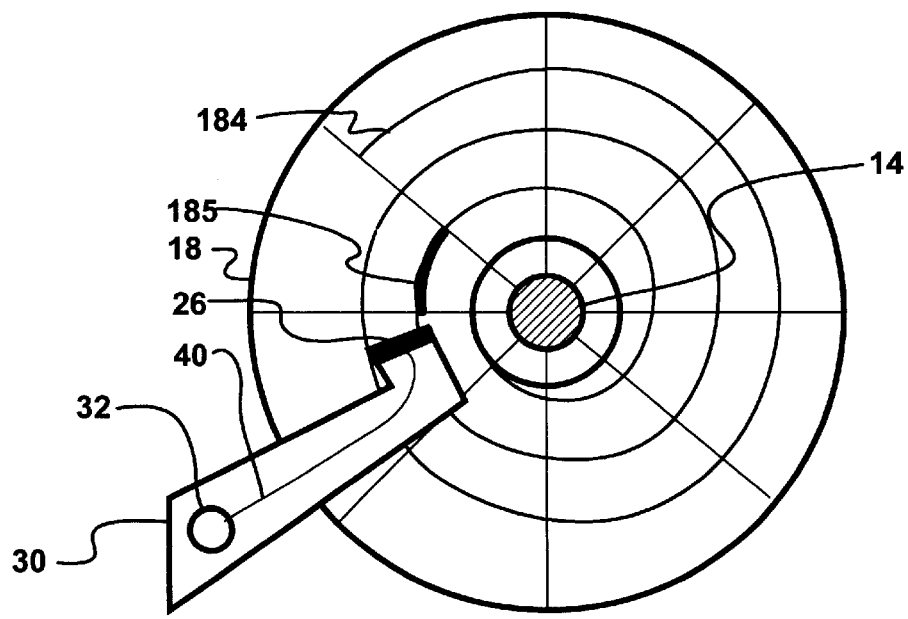
FIG. 8 illustrates a spiral surface-based data mapping of a stacked platter assembly according to an alternate embodiment of the present invention.

Referring now to FIG. 8, therein is shown a top view of an alternate mode of the present invention in the disk drive system 10 where the same components as described for FIG. 3 (PRIOR ART) have the same nomenclature and numbers herein. The disk drive system 10 has a plurality of platters, such as the platter 18. Each surface of the platter 18 is set up to store data and one or more of the radially-adjacent data tracks are connected, end to end, into a continuous, tightly wound spiral. The connected data tracks form the spiral 184 around the spindle 14. The spiral 184 includes a plurality of sectors, such as the sector 185, where blocks of data may be recorded. The spiral data track may spiral either clockwise or counter-clockwise, and the direction may alternate between surfaces.

Because the data track radius is very large compared to the inter-track spacing, the plurality of vertically stacked spiral data tracks effectively form stacked sets of data tracks as shown in FIGS. 5 and 6, and can be grouped into data track sets and bunches in the same way. The data layout mapping is most easily understood if each 360° portion of the spiral 184 is treated as being a circular and independent data track from its other 360° portions. It is also convenient to consider the joined set of data tracks in a single data track set as forming a single, separate spiral segment 184, even though the tracks at the ends of the data track sets may themselves be joined to their radially-adjacent tracks in the radially-adjacent data track sets as part of a larger spiral that might even include all the data tracks on one surface.

In operation, read/write accesses are performed horizontally along the spiral data track set 184 either moving inward towards or outward away from the spindle 14. Once the inner end or the outer end of the spiral segment 184 for the spiral data track set is reached, a head switch is performed to start the read/writes from the spiral data track set of the next surface either above or below the current surface.

The present invention increases the disk drive's performance by completely eliminating the need for track switches within a spiral data track set, and yet it maintains file management compatibility with current upper-level software and their disk operating systems, which a purely surface-based spiral data layout would not do. Joining the end tracks of adjacent bunches together, to form a larger spiral across the platter surface, also eliminates the need for a track switch in the case of the same-surface-bunch switch. And making the spirals on logically-adjacent surfaces wind in opposite directions better supports the bi-directional surface-mode mapping described above by eliminating the need for track seeks between tracks on the data track sets that have tracks filled in an inward direction.

It should be noted that, while the terms horizontal and vertical have been used to describe specific orientations of the present invention, the terms are relative and the disk drive system 10 may be oriented in a number of different positions.

Although the description here has been of an implementation of the various surface-based data layout mappings being performed in a disk drive controller, it could as easily be performed outside the disk drive. For example, it could be performed in a host computer, in the disk device driver, or in another software layer such as a logical volume manager or stacked logical device driver.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A method of disk drive system operation for a disk drive system having a plurality of surfaces for storing data blocks, each surface having a plurality of data tracks for storing the data blocks, comprising the steps of:
   grouping data tracks on a surface into a plurality of data track sets;
   grouping data track sets on different surfaces into a bunch; and
   providing a data layout mapping that maps logically adjacent data blocks:
      to a data track,
      then to a radially-adjacent data track on the same surface in the same data track set in a bunch,
      then to a different data track in a different data track set in the bunch, and
      from a first data track in a cylinder in the bunch to a second data track radially-adjacent to the first data track in a cylinder in a different bunch.

2. The method of disk drive system operation as claimed in claim 1 wherein the step of providing a data layout mapping includes the step of:
   mapping logically adjacent data blocks:
      to the data track,
      then to the radially-adjacent data track on the same surface in a first direction in the data track set in the bunch, then to the different data track in the different data track set in the bunch, and then to a radially-adjacent data track on the different surface in the first direction in the different data track set in the bunch.

3. The method of disk drive system operation as claimed in claim 1 wherein the step of providing data layout mapping includes the step of:

mapping logically adjacent data blocks:
to the data track,
then to the radially-adjacent data track on the same surface in a first direction in the data track set in the bunch,
then to the different data track in the different data track set in the bunch, and
then to the radially-adjacent data track on the different surface in a second direction in the different data track set in the bunch.

4. The method of disk drive system operation as claimed in claim 1 wherein the step of providing data layout mapping includes the step of:

mapping logically adjacent data blocks:
to the last track of a bunch on its surface, and
then to the first track of a different bunch on a different surface.

5. The method of disk drive system operation as claimed in claim 1 wherein the step of providing data layout mapping includes the steps of:

mapping logically adjacent data blocks:
to the last track of a bunch on its surface, and
then to the first track of a different bunch on the same surface.

6. The method of disk drive system operation as claimed in claim 1 including the step of:
providing a surface with a plurality of concentric, circular data tracks.

7. The method of disk drive system operation as claimed in claim 1 including the step of:
providing a surface with a plurality of radially-adjacent data tracks connected into a spiral.

8. The method of disk drive system operation as claimed in claim 1 wherein the step of providing data layout mapping includes the step of:
changing the data layout mapping during disk drive system operation.

9. The method of disk drive system operation as claimed in claim 1 wherein the step of providing data layout mapping includes the step of:
providing a plurality of different numbers of data tracks gathered into a data track set.

10. A method of disk drive system operation for a disk drive system having a plurality of surfaces for storing data blocks, each surface having a plurality of data tracks for storing the data blocks, comprising the steps of:
grouping data tracks on a surface into a plurality of data track sets;
grouping data track sets on different surfaces into a plurality of bunches; and
providing a data layout mapping that maps logically adjacent data blocks:
to a data track on a first surface,
to a radially-adjacent data track on the first surface in a data track set in a bunch when the data track is filled,
to a different data track on a second surface in a different data track set in the bunch when the data track set is filled, and
from a first data track in a cylinder in the bunch to a second data track radially-adjacent to the first data track in a cylinder in a different bunch.

11. The method of disk drive system operation as claimed in claim 10 wherein the step of providing a data layout mapping includes the step of:

mapping logically adjacent data blocks:
to a first data track on the first surface in a first data track set,
then, when the first data track is filled, to the radially-adjacent data track in the inward direction on the same first surface in the same first data track set,
then, when the first data track set is filled, to a different data track in a different data track set, and
then, when the different data track in the second data track set is filled, to an radially-adjacent data track in the inward direction on the second surface in the different data track set.

12. The method of disk drive system operation as claimed in claim 10 wherein the step of providing data layout mapping includes the step of:

mapping logically adjacent data blocks:
to a first data track on the first surface in a first data track set,
then, when the first data track is filled, to the radially-adjacent data track in the inward direction on the same first surface in the same first data track set,
then, when the first data track set is filled, to a different data track in a different data track set, and
then, when the different data track in the second data track set is filled, to an radially-adjacent data track in the outward direction on the second surface in the different data track set.

13. The method of disk drive system operation as claimed in claim 10 wherein the step of providing data layout mapping includes the step of:

mapping logically adjacent data blocks:
to a last data track in a last data track set on a last surface in a first bunch, and
then to a first data track in a first data track set on the first surface in a different bunch when the last data track of the first bunch is filled.

14. The method of disk drive system operation as claimed in claim 10 wherein the step of providing data layout mapping includes the steps of:

mapping logically adjacent data blocks:
to a last data track in a last data track set on a last surface in a first bunch, and
then to a first data track in a first data track set on the last surface in a different bunch when the last data track of the first bunch is filled.

15. The method of disk drive system operation as claimed in claim 10 including the step of:
providing a surface with a plurality of concentric circular data tracks centered on the spindle.

16. The method of disk drive system operation as claimed in claim 10 including the step of:
providing a surface with a plurality of radially-adjacent data tracks connected, end-to-end, into a spiral data track set.

17. The method of disk drive system operation as claimed in claim 10 wherein the step of providing data layout mapping includes the step of:
changing the number of data tracks in a data track set in the data layout mapping during disk drive system operation.

18. The method of disk drive system operation as claimed in claim 10 wherein the step of providing data layout mapping includes the step of:

changing the number of data track sets in a bunch in the data layout mapping during disk drive system operation.

19. A disk drive system comprising:

a disk drive having a spindle;

a plurality of platters mounted on the spindle and having:
surfaces for storing data,
each surface having a plurality of data tracks for storing data,
the plurality of data tracks disposed around the spindle,
the plurality of data tracks having radially different distances along each surface from the spindle grouped into a plurality of data track sets, and the plurality of data track sets having radially equidistant distances from the spindle on different surfaces grouped into a bunch; and a mechanism for providing a data layout mapping that maps logically adjacent data blocks:
to a data track,
then to a radially-adjacent data track on a surface in the same data track set in a bunch,
then to a different data track in a different data track set in the bunch, and
from a first data track in a cylinder in the bunch to a second data track radially-adjacent to the first data track in a in a cylinder different bunch.

20. The disk drive system as claimed in claim 19 wherein:

the mechanism for providing a data layout mapping has a data layout mapping wherein mapping of logically adjacent data blocks is:
to the data track,
then to the radially-adjacent data track along the surface in a first direction in the data track set in the bunch,
then to the different data track in the different data track set in the bunch, and
then to the adjacent data track radially along the different surface in a second direction in the different data track set in the bunch.

21. The disk drive system as claimed in claim 19 wherein:

the mechanism for providing a data layout mapping has a data layout mapping wherein mapping of logically adjacent data blocks is:
to the data track,
then to the radially-adjacent data track on the same surface in a first direction in the data track set in the bunch,
then to the different data track in the different data track set in the bunch, and
then to a radially-adjacent data track on the different surface in a second direction in the different data track set in the bunch.

22. The disk drive system as claimed in claim 19 wherein:

the mechanism for providing a data layout mapping has a data layout mapping including a plurality of bunches and wherein mapping logically adjacent data blocks is:
to the last track of a bunch on its surface, and
then to the first track of a different bunch on a different surface.

23. The disk drive system as claimed in claim 19 wherein:

the mechanism for providing a data layout mapping has a data layout mapping wherein mapping logically adjacent data blocks is:
to the last track of a bunch on its surface, and
then to the first track of a different bunch on the same surface.

24. The disk drive system as claimed in claim 19 wherein:

a surface has a plurality of concentric, circular data tracks.

25. The disk drive system as claimed in claim 19 wherein:

a surface has a plurality of data tracks forming a spiral.

26. The disk drive system as claimed in claim 19 wherein:

the mechanism for providing a data layout mapping changes the data layout mapping during disk drive system operation.

27. The disk drive system as claimed in claim 19 wherein:

the mechanism for providing a data layout mapping gathers different numbers of data tracks into a data track set during disk drive operation.

* * * * *